United States Patent [19]

Daghe et al.

[11] Patent Number: 4,506,694
[45] Date of Patent: Mar. 26, 1985

[54] RELIEF VALVE ASSEMBLY FOR USE WITH BACKFLOW PREVENTERS

[75] Inventors: Joseph L. Daghe, Decatur; Robert E. Sands, Shelbyville, both of Ill.

[73] Assignee: Mueller Co., Decatur, Ill.

[21] Appl. No.: 383,306

[22] Filed: May 28, 1982

[51] Int. Cl.³ .............................................. F16K 24/00
[52] U.S. Cl. .................................... 137/218; 137/107; 251/357
[58] Field of Search .................. 137/107, 218; 251/357

[56] References Cited

U.S. PATENT DOCUMENTS

| | | |
|---|---|---|
| 1,266,324 | 5/1918 | Schacht .......................... 251/357 |
| 1,960,144 | 5/1934 | Entriken . |
| 2,007,677 | 7/1935 | Farmer . |
| 2,329,368 | 9/1943 | Wood . |
| 2,389,413 | 11/1945 | Carlton . |
| 2,503,424 | 4/1950 | Snyder . |
| 2,577,967 | 12/1951 | Hughes . |
| 2,586,942 | 2/1952 | Grove . |
| 2,706,488 | 4/1955 | Harrington . |
| 3,173,439 | 3/1965 | Griswold et al. . |
| 3,181,560 | 5/1965 | Worden et al. . |
| 3,253,611 | 5/1966 | Cummins ...................... 251/337 X |
| 3,276,465 | 10/1966 | Wyckoff . |
| 3,283,772 | 11/1966 | Ensign . |
| 3,446,241 | 5/1969 | Skoli . |
| 3,724,487 | 4/1973 | Hunter . |
| 3,837,358 | 9/1974 | Zieg et al. . |
| 4,090,527 | 5/1978 | Sutherland . |
| 4,190,071 | 2/1980 | Dean et al. . |
| 4,231,387 | 11/1980 | Dixon . |
| 4,232,704 | 11/1980 | Becker et al. . |
| 4,241,752 | 12/1980 | Ackroyd . |
| 4,244,392 | 1/1981 | Griswold et al. . |
| 4,244,395 | 1/1981 | Griswold et al. . |
| 4,249,556 | 2/1981 | Waletzko . |
| 4,276,897 | 7/1981 | Griswold . |

Primary Examiner—Gerald A. Michalsky
Attorney, Agent, or Firm—Cushman, Darby & Cushman

[57] ABSTRACT

A relief valve assembly for use in backflow preventers having at least one check valve, the relief valve assembly being operable in response to changes in differential pressure across the check valve and in fluid connection downstream of the check valve for discharging liquid therefrom to atmosphere when a backflow condition occurs. The at least one check valve prevents backflow from a service pipe to the supply pipe but when the at least one check valve is fouled, and a backflow condition occurs, the relief valve assembly operates to permit the discharge of the liquid from the service line and prevent contamination of the supply line.

16 Claims, 7 Drawing Figures

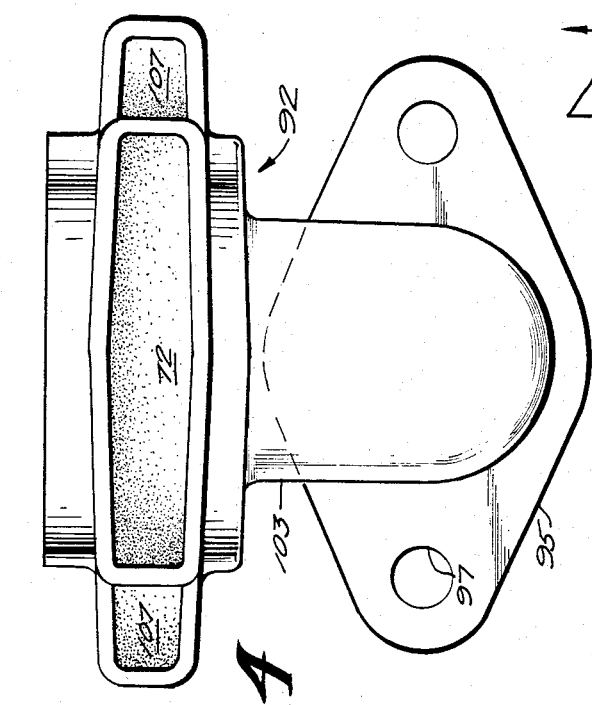
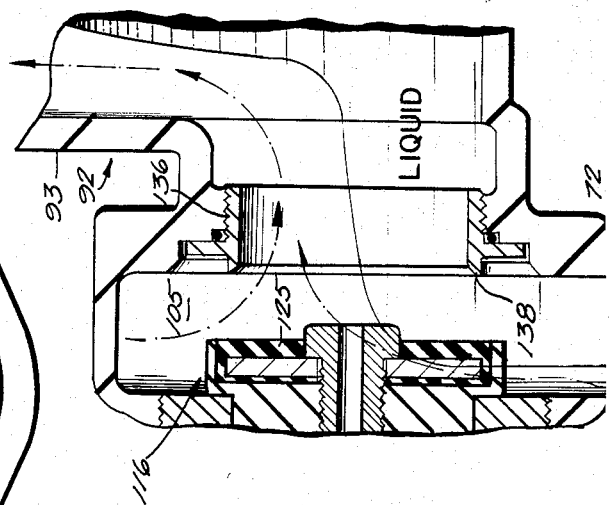
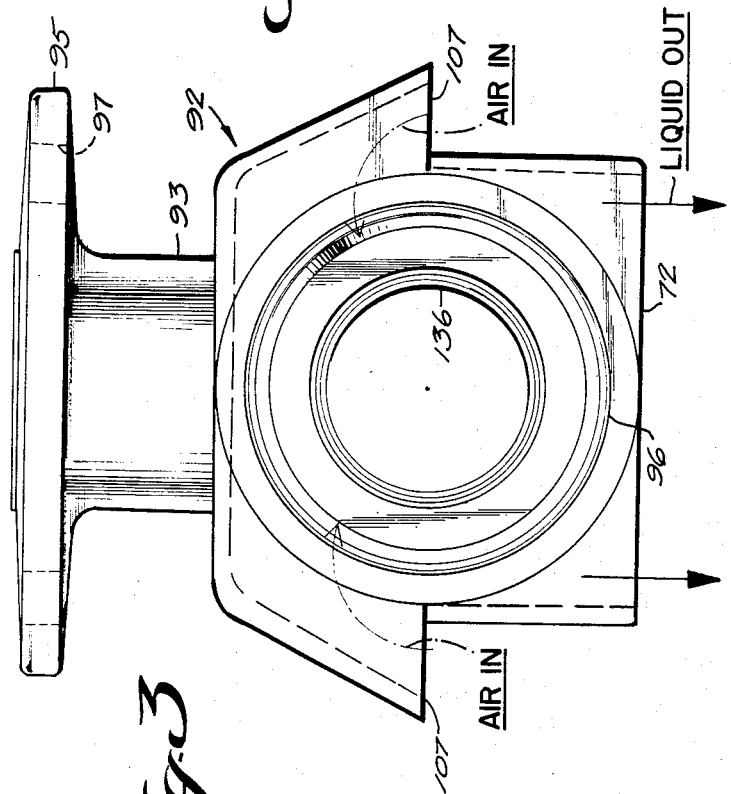
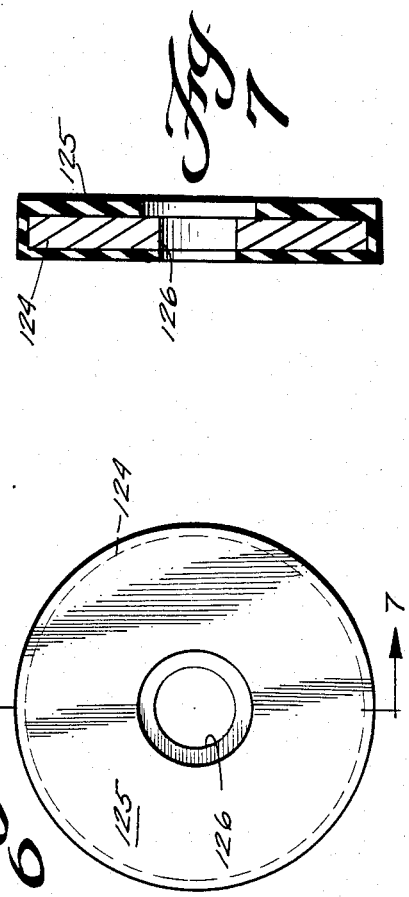

4,506,694

1

RELIEF VALVE ASSEMBLY FOR USE WITH BACKFLOW PREVENTERS

FIELD OF THE INVENTION

The present invention relates to a relief valve assembly for use with a backflow preventer apparatus utilizing at least one check valve. The relief valve assembly includes a valve in a passage communicating with the liquid downstream of the check valve, the valve in the relief valve assembly being operable upon a change in differential pressure across the check valve and when this pressure drops below a predetermined amount because of a backflow condition, the relief valve assembly opens and discharges liquid from the service pipe downstream of the check valve to the atmosphere. Preferably, the relief valve assembly of the present invention is utilized in backflow preventer apparatus having two check valves in series defining a zone therebetween, the relief valve assembly being in communication with the zone and operable upon a change in differential pressure across the first or upstream check valve to dump liquid therefrom.

BACKGROUND OF THE INVENTION

Backflow preventer apparatus are well known in the art and are used in water distribution systems to prevent contamination of the potable water portion by preventing backflow of liquid from the non-potable portion beyond a certain point in the system. Two conditions tend to produce backflow in a water distribution system. The first condition which could cause backflow is known as "back siphonage" and this occurs in the potable supply pipe or main when its pressure drops to cause a vacuum or partial vacuum in that portion of the system. This will cause a backflow of liquid from the service pipe and if the liquid in the service pipe is contaminated, it will also contaminate the potable water supply. The second condition to cause backflow is a condition occurring in the service pipe or nonpotable portion of the system. This condition results in a back pressure condition when the pressure in the nonpotable service pipe exceeds that in the potable supply pipe.

The backflow preventer apparatus is usually installed with a gate valve on either side of the same inbetween a main or supply pipe for potable water and a service line which may be subjected to contaminants and thus be nonpotable water. Installations can be made at inlets to factories such as chemical plants and the like, or inlets to institutions, hotels or any large building complex.

Prior relief valve assemblies used with backflow preventer systems as described above have usually been attached to the side of the backflow preventer body member and normally operated on a vertical axis. Additionally, the prior relief valve assemblies, while being operable in response to a change in the differential pressure across one of the check valves, have had a complicated piping system which required a separate connection to the zone or downstream service pipe for applying this pressure to one side of the diaphragm means therein. More importantly, the passage for dumping the liquid to atmosphere from the zone or the downstream service pipe in prior relief valve assemblies was so arranged that air could not flow in a reverse flow through the passage into the zone to as assist in quickly evacuating the zone.

In situations where malfunctions occurred in the prior relief valve assemblies, it was difficult to repair the relief valve assembly in the field as normally the entire relief valve assembly had to be removed from the backflow preventer apparatus. There was no easy means for servicing the valve element or valve seat in the relief valve assembly.

SUMMARY OF THE INVENTION

According to the present invention, there is provided a backflow preventer apparatus of the type having a body member with a flow passage therethrough having an inlet for connection to a supply pipe and an outlet for connection to a service pipe, the backflow preventer having a first upstream check valve and a second downstream check valve positioned in series in the flow passage and defining a zone therebetween. An improved relief valve assembly operable in response to changes in differential pressure between the line pressure of the supply pipe and the pressure in the zone is utilized with the backflow preventer, the relief valve assembly being provided with a housing having a passage with an inlet in communication with the zone, the passage having an outlet opening downwardly to atmosphere. A valve seat is provided in said passage and a valve element cooperates with the valve seat to close said passage. Downstream of the valve seat the passage is provided with an enlarged chamber surrounding the valve element, the chamber communicating with the outlet. At least one air port is provided in the housing above said outlet and communicating with said chamber, the port permitting air to be drawn therein and discharged in a reverse manner through said passage into said zone when the valve element is open and liquid is flowing from the zone through the passage and being discharged through the outlet. Rolling diaphragm means are provided in the housing of the relief valve assembly, the rolling diaphragm means having one side thereof communicating with the upstream line pressure of the supply pipe and the other side communicating with the zone pressure on the downstream side of said first check valve. The rolling diaghram means is operable upon a drop in the differential pressure across said first check valve. The diaphragm means normally urges the valve element towards closed position under normal conditions, but when the pressure drop in differential pressure is large enough, the zone pressure and spring means act on the diaphragm means to cause the valve in the relief valve assembly to open.

Another object of the present invention is to provide a relief valve assembly for use with a backflow preventer apparatus, the relief valve assembly being capable of mounting in either a vertical or a horizontal position on said backflow preventer apparatus. Ancillary to this object, it is a further object of the present invention to mount the relief valve assembly beneath the backflow preventer whereby less horizontal space is needed for the overall backflow apparatus.

Another object of the present invention is to provide a relief valve assembly in which the effective area of the upstream side of the valve in the relief valve assembly when the valve is closed is at least equal or greater than the effective area of the downstream or the back side of the valve element whereby pressures on the valve element are substantially cancelled out.

Another object of the present invention is to provide a valve element for the relief valve assembly which includes a stainless steel disc having an elastomeric covering molded completely about the same, the disc being attached to a small piston whereby the loading of the elastomeric covering is on the back side of the disc away from the side which seats on a valve ring. By not loading the elastomeric covering on the front of the disc, the elastomeric covering is prevented from possibly distorting and creating an undesirable condition that could cause sealing problems.

Still another object of the present invention is to provide a relief valve assembly which utilizes a slip design connection between the inlet connection that permits easy removability of the relief valve assembly for replacement or repairs.

Ancillary to the above, the inlet connection is provided with a cleanout port whereby the same may be flushed out if it becomes clogged.

Still another object of the present invention is to provide a relief valve assembly having an outlet to atmosphere for dumping liquid, the outlet being noncircular in cross-section so as to prevent attachment of any type of conventional piping or tubing to the same. Preferably the outlet is rectangular in cross-section.

These and other objects of the present invention will appear more fully in the following specification and drawings.

BRIEF DESCRIPTION OF THE DRAWINGS

FIG. 3 is an elevational view looking from the left to the right of FIG. 2 and substantially on the line 3—3 of FIG. 2, the value element being omitted for purpose of clarity;

FIG. 4 is a bottom plan view of FIG. 3;

FIG. 5 is a fragmentary sectional view disclosing the valve of the relief valve assembly in the open position and partial flow of liquid out of the assembly with air flowing in a reverse manner up through the assembly into the zone;

FIG. 6 is an end elevational view of the valve element; and

FIG. 7 is view taken on the line 7—7 of FIG. 6.

DETAILED DESCRIPTION OF THE INVENTION

Figure 1:
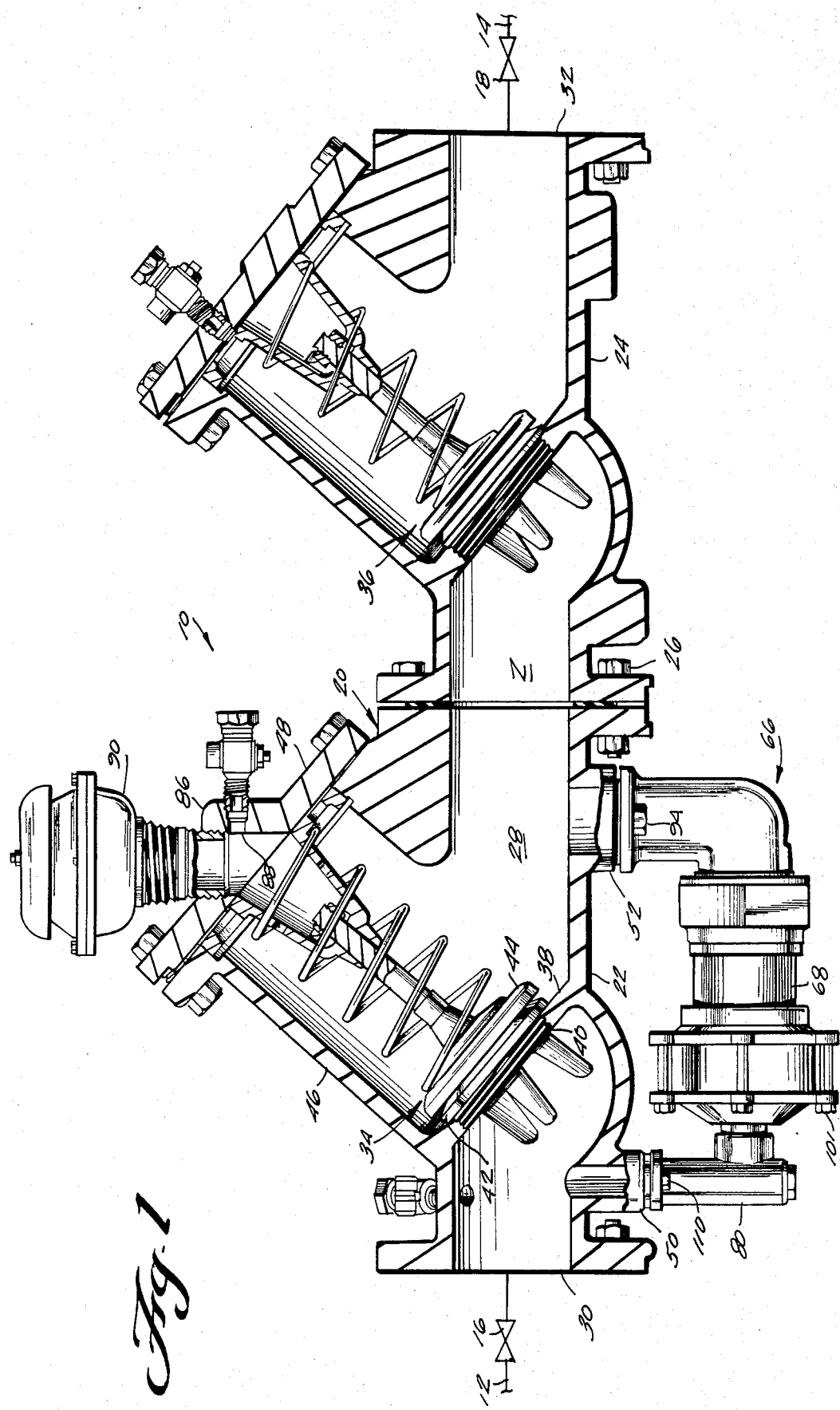
FIG. 1 is a partly schematic vertical sectional view of the backflow preventer apparatus of the present invention incorporating the improved relief valve assembly.

Referring to FIG. 1 wherein like characters reference numerals represent like or similar parts, there is disclosed the backflow preventer apparatus generally designated at 10. The backflow preventer apparatus 10 is positioned between a supply pipe 12 and a service pipe 14, the supply pipe being a main for potable water whereas the service pipe 14 is for nonpotable water, i.e. water which is or might be contaminated. Usually, the backflow preventer apparatus 10 is positioned between gate valves 16 and 18. The purpose of the gate valves, which are shown diagrammatically, is to test the system or to permit repair or replacement of the system.

The backflow preventer apparatus includes a body member 20 consisting of an upstream body portion 22 and a downstream body portion 24 bolted together as indicated at 26. Each body portion 22 and 24 carries a check valve, both check valves being open in the same direction to provide flow from the supply pipe 12 to the service pipe 14 when there is demand for liquid in the service pipe.

In more detail, the body member 20 is provided with a passageway 28 therethrough having an inlet 30 connected to gate valve 16 and an outlet 32 connected to gate valve 18. The upstream or first body portion 22 is similar in construction to the downstream or second body portion 24, and consequently a description of the body portion 22 and the first poppet-type check valve 34 will be given and will suffice for the description of the second or downstream body portion 24 and its poppet-type check valve 36. The portion of the passage 28 in body portion 22 is provided with a slanted web 38 having a threaded aperture 40 therethrough for receiving a valve seat ring 42. The valve seat ring is tapered and has a diameter equal to the diameter of the passage 28.

The valve 34 which includes the valve seat ring 42 also includes the movable valve element 44 which is spring urged to the closed position on the valve seat ring. The movable valve element 44 is a preloaded module that is tamperproof and which is disclosed in more detail in U.S. application Ser. No. 383,307, now U.S. Pat. No. 4,453,561, filed concurrently herewith by Robert E. Sands and entitled "CHECK VALVE ASSEMBLY FOR USE IN BACKFLOW PREVENTERS OR THE LIKE."

The body portion 22 is provided with a boss or barrel member 46 having an axis coaxial with the axis of the valve seat ring, and a cover plate 48 is bolted thereto to retain the movable valve element 44 in position on the valve seat ring. The description thus far for the body portion 22 and its check valve 34 is the same as for the body portion 24 and its check valve 36. The only difference between the check valve 34 and the check valve 36 is the amount of spring loading for the respective modules. The spring loading for the upstream check valve is set at a higher value than that for the downstream check valve.

Each of the check valves 34 and 36 and the body member 20 of the backflow preventer apparatus is configured to provide a minimum loss of pressure when the check valves are open and under a flow condition. A detailed disclosure of the configuration of the check valves 34 and 36 will be found in U.S. application Ser. No. 383,305, filed concurrently herewith by Joseph E. Daghe, Robert E. Sands and Dennis W. Humes, and entitled "BACKFLOW PREVENTER APPARATUS".

The first or upstream body portion 22 of the body member 20 is provided on its lower side with a connection fitting 50 having communication with line pressure of the supply pipe 12 upstream of the first check valve 34. The body portion 22 is also provided with a second connection fitting 52 provided on the lower side of the upstream body portion 22 at a position downstream of the check valve 34. The second connection fitting 52 communicates with the zone Z between the two check valves.

Figure 2:
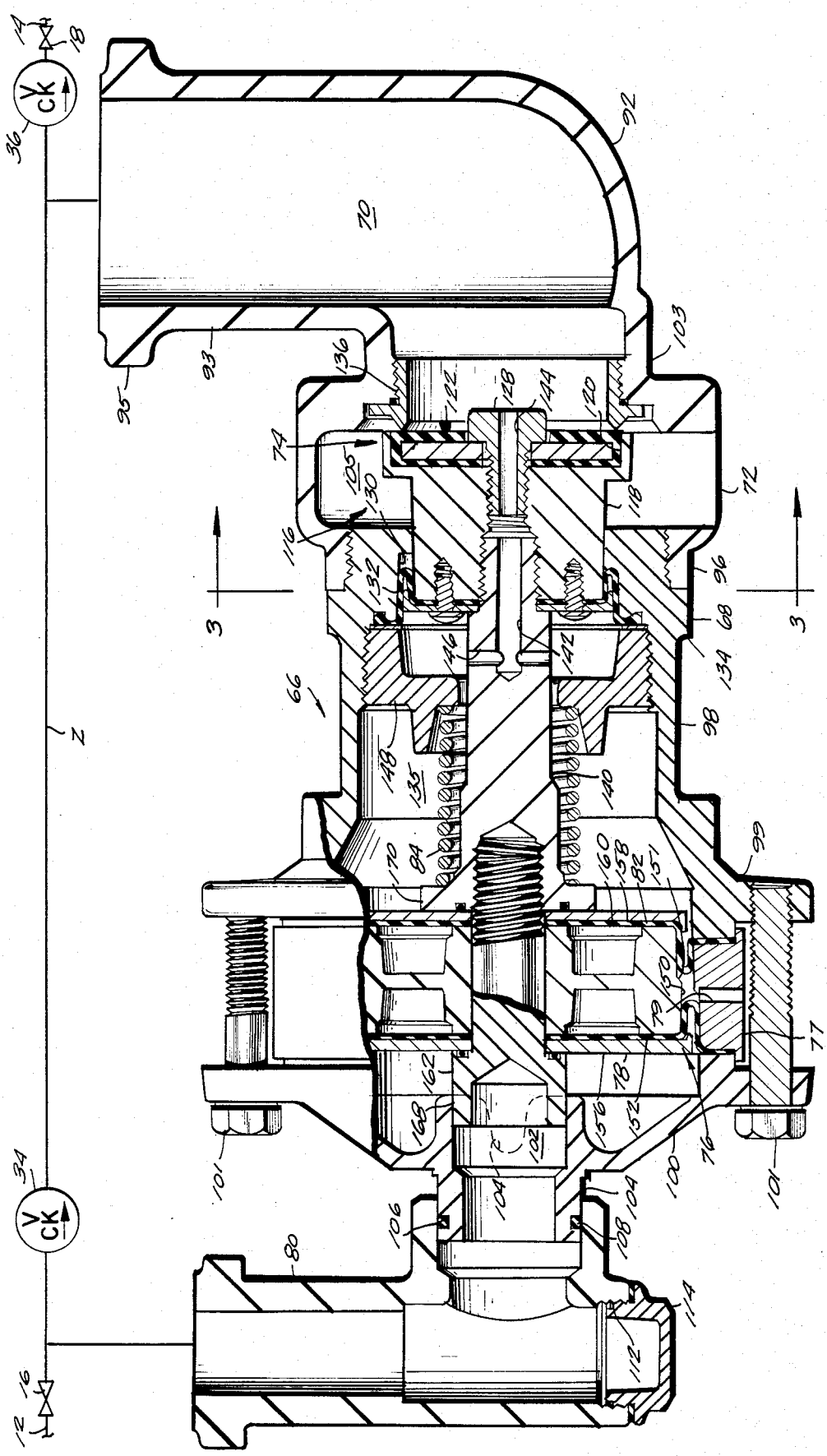
FIG. 2 is an enlarged vertical cross-sectional view of the relief valve assembly shown in FIG. 1, the view illustrating diagrammatically its connection to the backflow preventer.

Attached to the fittings 50 and 52 is a differential pressure operable relief valve assembly 66 of the present invention. The relief valve assembly which is best shown in FIG. 2 is responsive to the differential pressure between the line pressure of the supply pipe 12 and the pressure in the zone Z between the check valves 34 and 36. The assembly 66 is provided with a housing 68 having a passage 70 in one end thereof which is in communication at its inlet with the zone Z. The passage 70 has a downwardly facing outlet 72 and a normally closed valve 74 upstream of the outlet 72. The valve 74 is operatively connected to rolling diaphragm means 76 having one side 78 in communication through a connector 80 with the line pressure of supply pipe 12 and the other side 82 in communication with zone pressure through the valve means 74.

The differential pressure across the first check valve 34 is usually a predetermined amount, for example, 8 psi. Thus, the upstream or line pressure could be 60 psi during normal operation and the zone pressure could be 52 psi with the pressure in the service line 14 downstream of the second check valve 36 being 50 psi. When a backflow condition arises, which in the case of back siphonage causes a drop in line pressure or in the case of back pressure wherein the pressure in the zone as reflected from the service line pressure increases, there results a drop in differential pressure across the check valve 34. The rolling diaphragm means 76 coupled with the spring 84 is designed so that when the differential pressure drops from, for example, 8 psi, to, for example, 4 psi, the rolling diaphragm means 76 moves towards the left and opens the valve 74 to permit liquid to drain from the zone.

In more detail, the housing 68 of the relief valve assembly is mounted on a horizontal axis beneath the body member 20 of the backflow preventer 10. The housing 68 includes an elbow-shaped first member or connector 92 for connection to the fitting 52 on the body member 20 of the backflow preventer 10 by bolts 94. The first member 92 contains the passage 70 and the downwardly facing outlet 72, and it is provided with an interiorly threaded end 96 for receiving a generally tubular second member 98 of the housing 68. The other end of the generally tubular second member 98 is open but is adapted to receive the rolling diaphram means 76 and the spacer ring 77 which is held in place by means of a cap plate 100 bolted thereto by bolts 101 having an opening 102 therethrough with an annular collar 104 surrounding the opening and extending outwardly thereof. The annular collar 104 is provided with an annular groove 106 thereon for receiving an O-ring seal 108.

The connector 80 which is elbow shaped is arranged to be slidably received on the collar 104 and make a seal therewith by means of the O-ring 108. When so positioned, the connector 80 is then bolted to the fitting 50 as indicated at 110. The elbow-shaped connector 80 is provided with a cleanout port 112 which normally receives a threaded cap 114. If, for any reason, the connector 80 becomes clogged which is highly unusual because of the large inlet port, the cap 114 can be removed and the connector flushed out.

The generally tubular second member 98 is provided with an opening through its end which is threaded into the first member 92 at 96. This opening is adapted to receive a small piston 118 of a movable valve element 116. The small piston 118 has an annular recess 120 for receiving a valve disc member 122. The valve disc member 122, as best shown in FIGS. 6 and 7, includes a stainless steel disc element or insert 124 having an aperture 126 therethrough. The disc element 124 has molded to its exterior an elastomeric covering which may be rubber or the like, and it may be noted that on the surface facing upstream in the passage 70, the covering exposes a portion of the disc element or insert 124. The purpose for this is that when the valve disc member 116 is attached to the piston 118 by the threaded bolt 128, the bolt head bears against the disc or insert 124 rather than against the elastomeric covering 125, and this makes the rear face of the valve disc element 122 receive all of the loading with no loading being made on the front surface of the elastomeric covering. Consequently there is no possibility of the portion of the covering engaging the valve seat ring 136 being distorted and causing sealing problems.

A counterbore is provided in the tubular member 98 as indicated at 130. This counterbore 130 is arranged to receive the convolution 132 of a rolling diaphragm-type seal 134. The seal 134 seals between the exterior of the piston 118 of the movable valve element 116 and the interior wall of the housing and aids in centering the piston during horizontal movement. It also defines one end of a chamber 135, the other end being defined by the side 82 of the diaphgram means 76.

A valve seat ring 136 is threadedly received in the passage 70 of the first member 92, the valve seat ring 136 having an inwardly tapering seat surface 138 for cooperating with the elastomeric covering 125 of the valve disc 122. A shaft 140 threadedly received in the piston 118 extends horizontally toward and is attached to the rolling diaphragm means 76. The shaft 140 has an axially extending passageway 142 which communicates with a passageway 144 through the bolt 128. The passageway 142 terminates into one or more radially extending passages 146 and, thus, pressure of fluid in the passage 70 acts on both sides of the valve 74 as well as in the chamber 135 on one side 82 of the rolling type diaphragm means 76. A spring retainer ring nut 148 is threaded into the tubular second member of the housing, the ring nut 148 functioning to retain one end of the spring 84 and also functioning to retain the periphery of the rolling diaphragm-type seal 134.

The rolling diaphragm means 76 includes a large piston 150, an inlet rolling diaphragm 152, an inlet retainer plate 156, a zone rolling diaphragm 158 and a zone retainer plate 160. These elements are held together by a bolt guide 162 which is also received in the end of the shaft 140. The bolt guide 162 has a head 168 which loosely rides in the opening or passage 102, and cutouts 104 are provided in the wall of the passage 102 so that fluid pressure can pass the bolt head 102 to the inlet side 78 of the diaphragm means 76. The spring 84, as previously mentioned, has one end retained by the ring nut 148, whereas the other end bears against the flange end 170 of the shaft 140.

As clearly shown in FIG. 2, the outer peripheries of the rolling diaphragms 152 and 158 are clamped respectively between the cap plate 100 and the end flange portion 99 of the tubular second member 98 of housing 66. The annular spacer ring 77 is interposed between the respective outer peripheries of the rolling diaphragms 152 and 158, respectively. It should be further noted the large piston 150 has a reduced portion 151, whereas the spacer ring opposite the reduced portion 151 has a decreased interior diameter. The purpose of this configuration for the elements 150 and 77 is that the rolling diaphragm 158, which is subjected to zone pressure in the chamber 135, is calibrated to be smaller than the diaphragm 152 as chamber pressure of the chamber 135 coupled with the spring pressure of the spring 84 opposes the line pressure acting on the diaphragm 152. The spacer 70 is provided with a drain port 79 which has one end communicating to the area between the convolutions of the rolling diaphragms 152 and 158 and the other end opening to atmosphere. Should either of the diaphragms 152 or 158 fail and leak, the leak will be noted by maintenance personnel immediately. With regard to the rolling seal 134 for the movable valve element, should it fail, there will be immediate evidence as liquid from the chamber 135 would flow between the wall of piston 118 and the end of the tubular second member 98, this liquid being discharged through the outlet port 72.

Referring now to FIGS. 3 and 4, the elbow-shaped first member or connector 92 provides the passage 70 from the body member 20 of the backflow preventer 10 through to the port 72. As will be noted, one leg 93 of the member 92 is provided with a flanged end 95 having apertures 97 therein which receive the bolts 94 for connecting the member 92 to the connector 52.

The other leg 103 of the elbow-shaped first member 92 is threaded at one end, as indicated at 96, for receiving the second member 98, as previously described. Additionally, the leg 103 threadedly carries the removable valve seat ring 136 and provides a continuation of the passage 70 to the outlet 72. As shown in FIG. 4, the outlet 72 is non-circular in cross-section and preferably is generally rectangular in cross-sectional configuration. This irregular shape is provided to prevent unauthorized attachment of conventional pipes or hoses. When the movable valve element 116 is in the closed position as shown in FIG. 2, an enlarged chamber 105 surrounds the valve element 116, this chamber communicating with the outlet 72. Additionally, the leg 103 of the first member 92 is provided with ports 107 on either side of the same, the ports 107 communicating with the chamber 105 at an elevation above the elevation of the outlet 72.

Referring to FIGS. 3 and 5, when the movable valve element 116 is moved off its valve seat 138 due to a backflow condition caused by either back siphonage or back pressure, liquid will begin to flow out of the outlet 72. When the flow of liquid in the passage 70 is not sufficient to fill the passage 70, air is sucked in the ports 107 and flows in a reverse manner through the member 92 into the zone between the first and second check valves 34 and 36. This assists in quickly evacuating the zone. Of course, if there is a full flow of liquid in the passage 70, air will not be drawn in the ports 107, but rather they will function as secondary ports for discharging liquid just in addition to liquid being discharged through outlet 72.

It will be noted in FIG. 1, the first or upstream body portion 22, which contains the poppet-type check valve 34, is provided with a vacuum breaker 90 carried in a boss 86 provided on the cover plate 48. The vacuum breaker 90 communicates with the zone, and its function is disclosed more fully in the aforementioned Daghe et al application Ser. No. 383,305. The vacuum breaker 90 is not essential to the present invention.

Additionally, the present invention is shown and described in connection with a backflow preventer apparatus having two check valves in series to define a zone therebetween. Of course, there are situations where a backflow preventer may only require one check valve and thus the relief valve assembly of the present invention could be used with such a check valve to dump liquid from downstream of the same during either a back-siphonage or back-pressure condition.

The design of the relief valve assembly described above permits easy removability for replacement or repairs. In this respect, when it is desired to repair the valve seat ring 136, the movable valve element 116 or the diaphragm means 76, this procedure is followed. First, the inlet gate valve 16 and the outlet gate valve 18 are closed to isolate the relief valve assembly from line pressure of the supply pipe 12 and pressure of the service pipe 14. Then the two bolts 110 which hold the connector 80 to the connector 50 are removed, and inlet connector 80 is then slipped off of the collar 104. Then the second member 98 of the housing 66 is unthreaded from the first member, and the seat 136 will be fully exposed for repair or replacement. The second member 98 carries the diaphragm means 76 and the movable valve element 116 and, of course, it can then be disassembled for repair or replacement of any of the parts therein.

The relief valve assembly is mounted beneath the backflow preventer 10 with the diaphragm means 76, seal 132, and movable valve element 116 all having a coaxial horizontal axis. By utilizing rolling diaphragms 152 and 158 and the rolling diaphragm type seal 132, the movable parts of the assembly are self-centering during continuous operation even when mounted horizontally as shown. Of course, the relief valve assembly could be mounted on a vertical axis if desired.

The terminology used in this specification is for the purpose of description and not limitation, the scope of the invention being defined in the claims.

What is claimed is:

1. A backflow preventer apparatus having an inlet adapted to be connected to a supply pipe and an outlet adapted to be connected to a service pipe, said backflow preventer apparatus comprising:

a body member having a flow passage therethrough from the inlet to the outlet;

a first upstream check valve and a second downstream check valve in series in said passage and defining a zone therebetween, said first check valve and said second check valve being operable to open position to permit flow of liquid from said supply pipe to said service pipe upon demand for liquid in said service pipe and closed to oppose reverse flow of liquid from said service pipe to said supply pipe; and a relief valve assembly operable in response to changes in differential pressure between line pressure of said supply pipe and pressure in said zone, said relief valve assembly being mounted beneath said body member and including a housing having a passage therein with an opening in communication with said zone, said opening in the passage of the housing being totally below both said first check valve and said second check valve, said opening of the passage of the housing defining an inlet for discharge of liquid from said zone to the passage and an outlet for discharge of air from said passage to said zone, said passage having an outlet for liquid opening downwardly to atmosphere, valve means positioned in said passage above said liquid outlet, said valve means including a valve seat lying in a substantially vertical plane and a valve element cooperating with said seat, said valve element operating on a substantially horizontal axis, said passage downstream of said valve seat having an enlarged chamber surrounding said valve element and communicating with said liquid outlet, at least one air port in said housing above said liquid outlet and communicating with said chamber above a lower portion of said valve means, said at least one air port opening downwardly to atmosphere and permitting air to be drawn into an upper portion of said chamber and discharged through said passage and the opening of the same into said zone when said valve element is open and while liquid is flowing from the zone through said opening of said passage of the housing but not filling said passage and being discharged through said liquid outlet, rolling diaphragm means in said housing, means providing communication between the passage in said body member upstream of said first check valve and one side of said diaphragm means, means providing communication between the zone and the other side of said diaphragm means, means connecting said valve element to said diaphragm means for movement thereby, spring means normally urging said valve element toward open postion, said diaphragm means normally urging said valve element towards closed position when there is a predetermined pressure across said first check valve and toward open position in conjunction with said spring means when there is a pressure drop below said predetermined closing differential pressure across said first check valve.

2. A backflow preventer apparatus as claimed in claim 1 wherein said outlet to atmosphere in said housing for said passage is noncircular in cross-section.

3. A backflow preventer apparatus as claimed in claim 2 wherein said noncircular outlet is rectangular.

4. A backflow preventer apparatus as claimed in claim 1 in which said means providing communication between the other side of said diaphragm means and said zone includes a passageway extending through said valve element and communicating with the passage in said housing to said zone, and a rolling seal between said valve element and said housing.

5. A backflow preventer apparatus as claimed in any one of claims 1, 2 or 3 wherein said rolling diaphragm means includes a piston, a first rolling diaphragm carried by said piston and said housing, said first diaphragm having one side subjected to the pressure of said supply pipe and the other side subjected to atmospheric pressure and a second rolling diaphragm carried by said piston and said housing, said second diaphragm having one side subjected to pressure of said zone and the other side thereof to atmospheric pressure, said first diaphragm having an effective area greater than an effective area of said second diaphragm.

6. A backflow preventer apparatus as claimed in claim 5 in which said means connecting said valve element to said diaphragm means includes a shaft extending from said piston to said valve element.

7. A backflow preventer apparatus as claimed in claim 6 in which said valve element and said piston are coaxial and arranged to move on a horizontal axis, said relief valve assembly being mounted beneath said body member.

8. A backflow preventer apparatus as claimed in claim 5 in which said means providing communication between the other side of said diaphragm means and said zone includes a passageway extending through said valve element and communicating with the passage in said housing to said zone, and a rolling diaphragm-type seal between said valve element and said housing to provide a chamber defined by said housing and said second rolling diaphragm for receiving zone pressure.

9. A backflow preventer apparatus as claimed in claim 8 in which said valve element and said piston move on a horizontal axis and said relief valve assembly is mounted beneath said body member, said first rolling diaphragm and said second rolling diaphragm and said rolling diaphragm-type seal providing self-centering of said diaphragm means and said valve element during operation of said relief valve assembly.

10. A backflow preventer apparatus as claimed in claim 9 in which said rolling diaphragm-type seal between said valve element and said housing has an effective area no greater than an effective area of said valve seat whereby total zone pressure acting on said rolling diaphragm-type seal from said chamber and tending to seat said valve element on said valve seat is effectively cancelled by total zone pressure acting on said valve element and tending to open said valve element when the same is seated on said seat.

11. A backflow preventer apparatus as claimed in claim 10 wherein said means connecting said valve element to said diaphragm means includes a shaft extending from said piston to said valve element and wherein said passageway extending through said valve element also extends partway through said shaft and opens to said chamber defined by said housing and said second rolling diaphragm.

12. A backflow preventer apparatus as claimed in claim 11 including means for quick removal of said relief valve assembly from said body member for replacement or repair.

13. A backflow preventer apparatus as claimed in claim 11 wherein said valve seat includes a valve ring having a seating surface tapering inwardly and wherein said valve element includes a piston connected to said shaft, a metal valve disc having a hole therethrough, said metal valve disc being coated with an elastomeric material on both sides of the same and a cap screw for retaining said metal disc on said piston with loading of the elastomeric material being only on a backside of said disc, said cap screw having an axial hole therethrough forming part of said passageway.

14. A backflow preventer apparatus as claimed in claim 13 in which said cap screw has a head and said head bears directly on said metal disc.

15. A backflow preventer apparatus as claimed in claim 14 including a ring nut threaded into said housing and providing a stop for said spring means.

16. A backflow preventer apparatus as claimed in claim 5 in which a drainhole is provided in said housing intermediate said first rolling diaphragm and said second rolling diaphragm and through which each said other side of said first and second rolling diaphragms are exposed to atmosphere and whereby liquid will drain from said housing upon failure of either of said first and second diaphragms.

* * * * *